Aug. 7, 1934.   F. TRELOAR   1,968,863
ADJUSTABLE ARBOR SUPPORT
Filed Feb. 3, 1933
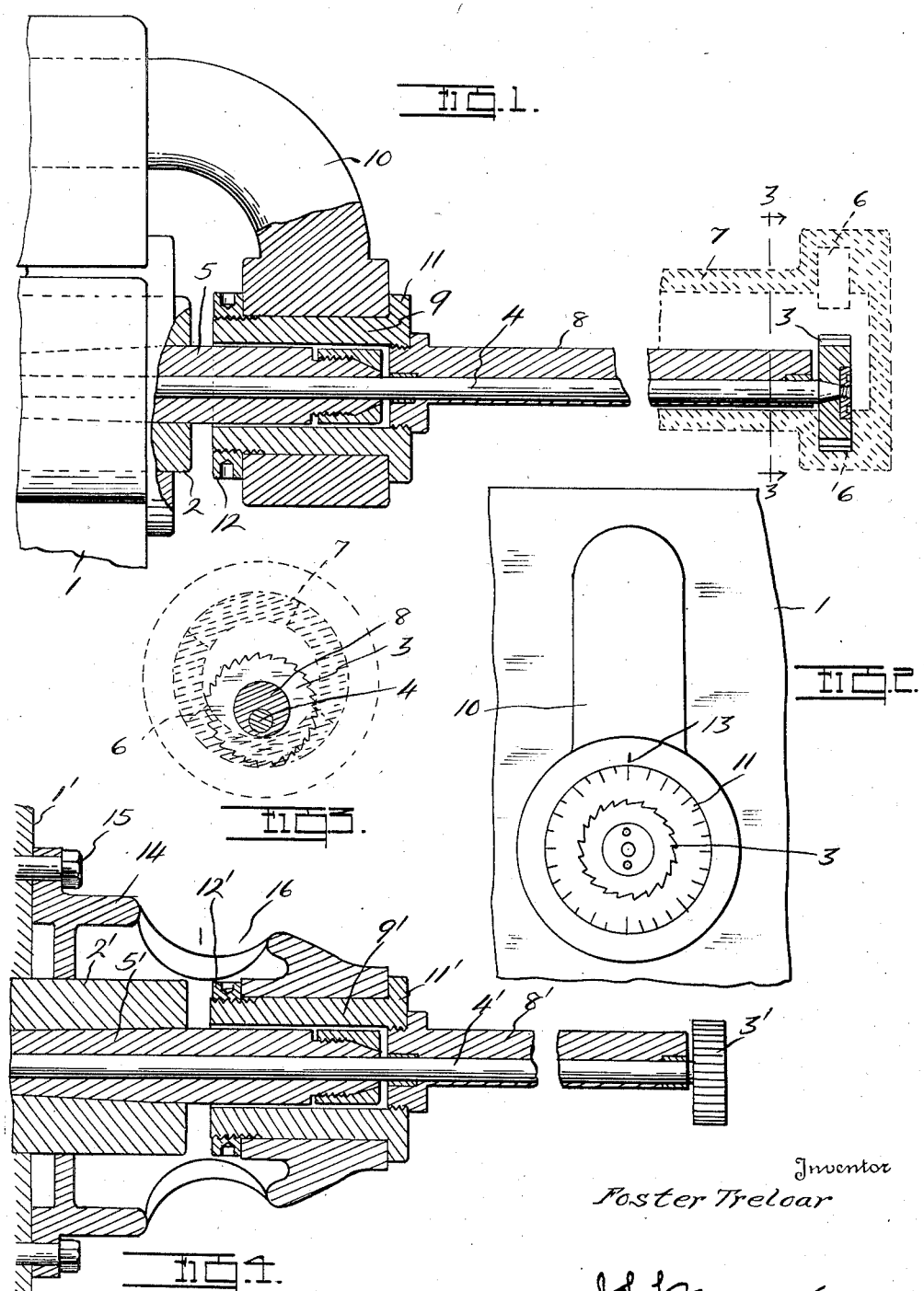

Patented Aug. 7, 1934

1,968,863

UNITED STATES PATENT OFFICE 1,968,863

ADJUSTABLE ARBOR SUPPORT

Foster Treloar, Detroit, Mich.

Application February 3, 1933, Serial No. 655,090

5 Claims. (Cl. 90—18)

This invention relates to adjustable bearings for machine tool arbors and particularly for milling machine cutter arbors.

In a milling operation requiring mounting of the cutter on an arbor extending some distance from the frame of the milling machine, the reaction of the work on the cutter requires either a heavy arbor or an elongated bearing for the arbor to resist its flexure. A heavy arbor is undesirable since, for a given depth of milled opening, the diameter of the cutter must be increased proportionately to the arbor diameter. An elongated journal bearing, if of ordinary construction also eliminates the possible use of cutters below a certain diameter, since the cutter can enter the work only to the extent of its projection beyond the bearing.

An object of the invention is to provide an elongated bearing for journaling a cutter arbor, the arbor being received in such an eccentric relation to the axis of said bearing as to avoid material limitation by said bearing of the minimum diameter of cutter that may be effectively used.

Another object is to adapt such a bearing to be selectively rotatively adjusted about the axis of the arbor so that the minimum radius of said bearing, with respect to said axis, may be conformed to any desired direction of radial feed of the cutter.

A further object is to provide a support for the aforesaid bearing forwardly projecting from a milling machine frame, and to adapt said bearing to be held selectively adjusted in said support about the axis of the cutter arbor.

Still another object is to provide an angular index for definite determination of a desired rotative position of said bearing relative to the arbor.

These and various other objects the invention attains by the construction hereinafter described and illustrated in the accompanying drawing, wherein:

Fig. 1 is a fragmentary elevational view of a milling machine, sectionally showing an application of the present invention to said machine, and indicating in dash lines a cylinder positioned for milling.

Fig. 2 is a fragmentary front view of the same.

Fig. 3 is a vertical sectional view of the cutter arbor, and an eccentric bearing for said arbor, showing also engagement of the cutter with said cylinder.

Fig. 4 is a sectional elevational view of the invention in a modified form.

In these views, 1 designates the frame of a milling machine, 2 the drive spindle of said machine, 3 the milling cutter, 4 an arbor whereon said cutter is secured, and 5 a collet chuck clamped upon said arbor and rigidly mounting the latter in the spindle 2.

To properly position the cutter for milling ports 6 in a closed end portion of an elongated cylinder 7, the arbor 4 projects considerably forward of the frame 1, and reinforcement of said arbor is therefore necessary to resist the reactive force exerted through the cutter. Such a reinforcement is formed by an elongated bearing 8, eccentrically journaling the arbor and extending in close proximity to the cutter. Said bearing is rigidly supported, adjacent to the frame 1, by a sleeve 9 coaxial with the arbor, and said sleeve is rotatively adjustable in an arm 10 which projects forwardly from the frame and is downwardly curved to mount said sleeve. It is preferred to provide for ready detachment of the bearing 8 from the sleeve 9 by forming said bearing at its supported end with an enlargement coaxial with the arbor-receiving opening of the bearing, which enlargement is screw-threaded into the sleeve 9. Said sleeve is proportioned to freely interiorly receive the outer portion of the collet 5. As a preferred means for holding the sleeve 9 in a selective rotative adjustment, an annular exterior flange 11 on the front end of said sleeve engages the corresponding face of the arm 10 and a clamping nut 12 on the rear end of the sleeve may be tightened against the rear face of said arm. Upon loosening said nut, the sleeve and the bearing 8 which it carries may be turned where desired and there held through again tightening the nut. To permit of accurate angular adjustments of the sleeve, it is preferred to radially index the front end face of said sleeve, near its outer periphery, as shown in Fig. 2 and to provide a coacting index line 13 on the arm 10, above said sleeve.

In the modification shown in Fig. 4, the construction conforms to the previous description, except that the arm 10 is replaced by a hollow fitting 14 of substantially frusto-conical form, which is coaxial with the arbor 4' and bolted, as indicated at 15 to the front of the frame, said fitting having a plurality of openings 16, giving access to the nut 12', and the sleeve 9' being clamped, coaxially with the arbor, in the reduced front portion of said fitting.

In use of the described invention, when it is desired to mill an opening in a certain surface, as the interior face of the cylinder 7, the sleeve 9 is first adjusted to locate the thinnest portion of the wall of the bearing 8 to face the surface in which a cut is to be taken. As clearly appears in Figs. 1 and 3, this permits the cutter to be fed into said surface to a maximum depth before the bearing 8 encounters said surface, prohibiting further feed. It is here to be noted that the bearing wall requires very little, if any thickness, in the direction of feed of the cutter, since the reactive force of the work acts oppositely to the direction of feed and is therefore effective only upon the relatively thick portion of the bearing wall.

Rotative adjustability of the bearing 8 is essential since the thin-walled portion of the bearing must always face in the direction of feed of the cutter, and the possible angular variations in the direction of feed are innumerable. Thus for example in Figs. 1 and 3, the two ports 6 in the cylinder 7 are diametrically opposed, so that after cutting one of said ports, the operator must make a one hundred and eighty degree adjustment of the sleeve 9 and bearing 8, to provide for proper cutting of the other.

That portion of the bearing wall having a maximum thickness is in Figs. 1 and 3 shown above the arbor 4 and said thickness is that necessary to safely resist the maximum reaction to which the cutter will be subjected in being fed into any piece of work. It will be noted that the cutter radius is only slightly greater than the maximum thickness radius of the bearing, so that the possible depth of cut would be greatly reduced were it not for the eccentric positioning of the arbor in said bearing.

Thus for any job in which the arbor requires a reinforcing bearing, the described invention permits a required depth of cut to be secured with a minimum diameter of cutter and for any practical diameter of cutter permits a maximum depth of cut. Since cutter steel is of very high grade and correspondingly expensive, it is obviously of considerable economical importance that no larger cutter be used on any job than is necessary.

On some jobs also, as exemplified in Fig. 1, the cutter in advancing to its position of use must pass through an opening which limits the possible diameter of said cutter. The invention has a special application to such a job, since it permits a depth of milled opening that would otherwise be impossible to attain.

The invention is not limited in its use, however, to the operation exemplified in the drawing, and can be used to advantage on any job in which the arbor carrying a cutting tool or a bearing reinforcing said arbor is approached to the work in a cutting operation, so as to limit the depth of cut.

The invention is presented as including all such modifications and changes as properly come within the scope of the following claims.

What I claim is:

1. In a machine tool appliance, the combination with the frame of a machine tool, of a driven arbor projecting beyond said frame, a support carried by and adjacent to said frame, a cutter fast on said arbor, remote from said support, an elongated bearing eccentrically journaling said arbor and extending between said cutter and support and rotatively adjustable on said support about the axis of said arbor, and means for holding said bearing selectively rotatively adjusted in said support.

2. In a machine tool appliance, the combination with the frame of a machine tool, of a driven arbor projecting beyond said frame, a cutter fast on said arbor remote from said frame, an elongated bearing eccentrically journaling said arbor between said cutter and the frame, a support wherein said bearing is rotatively adjustable about the axis of said arbor, and means for holding said bearing in selective positions of such adjustment.

3. In a machine tool appliance, the combination with the frame of a machine tool, of a support carried by and adjacent to said frame, a sleeve rotatively adjustable about its longitudinal axis in said support, means for holding said sleeve in selective positions of its rotative adjustment, a driven arbor projecting from said frame and extending through the sleeve, coaxially therewith, a cutter fast upon said arbor remote from said sleeve, and a bearing eccentrically journaling said arbor, carried by the sleeve and elongated between the sleeve and said cutter.

4. In a machine tool appliance, the combination with the frame of a machine tool, of a support carried by and adjacent to said frame, a sleeve rotatively mounted in said support, and formed at one of its ends with a shoulder for abutting the corresponding side of said support, a nut threaded upon the other end of said sleeve for clamping engagement with the other side of said support, whereby said sleeve may be held selectively rotatively adjusted in said support, a driven arbor projecting from said frame and extending through said sleeve coaxially therewith, a cutter fast upon said arbor remote from said sleeve, and a bearing eccentrically journaling said arbor, carried by said sleeve and elongated between said sleeve and the cutter.

5. In a machine tool appliance, the combination with the frame of a machine tool, of a spindle journaled in said frame, a sleeve adjacent to said frame and having its axis in the extended axis of said spindle, a collet carried and driven by said spindle and extending into said sleeve, an arbor carried and driven by said collet and passing through said sleeve, coaxially therewith, a cutter fast on said arbor remote from said sleeve, an elongated bearing eccentrically journaling said arbor and extending between said cutter and sleeve and carried by the latter, a support rotatively mounting said sleeve and projecting from said frame, and means for holding said sleeve selectively rotatively adjusted in said support, whereby said bearing may be turned about the arbor axis.

FOSTER TRELOAR.